UNITED STATES PATENT OFFICE.

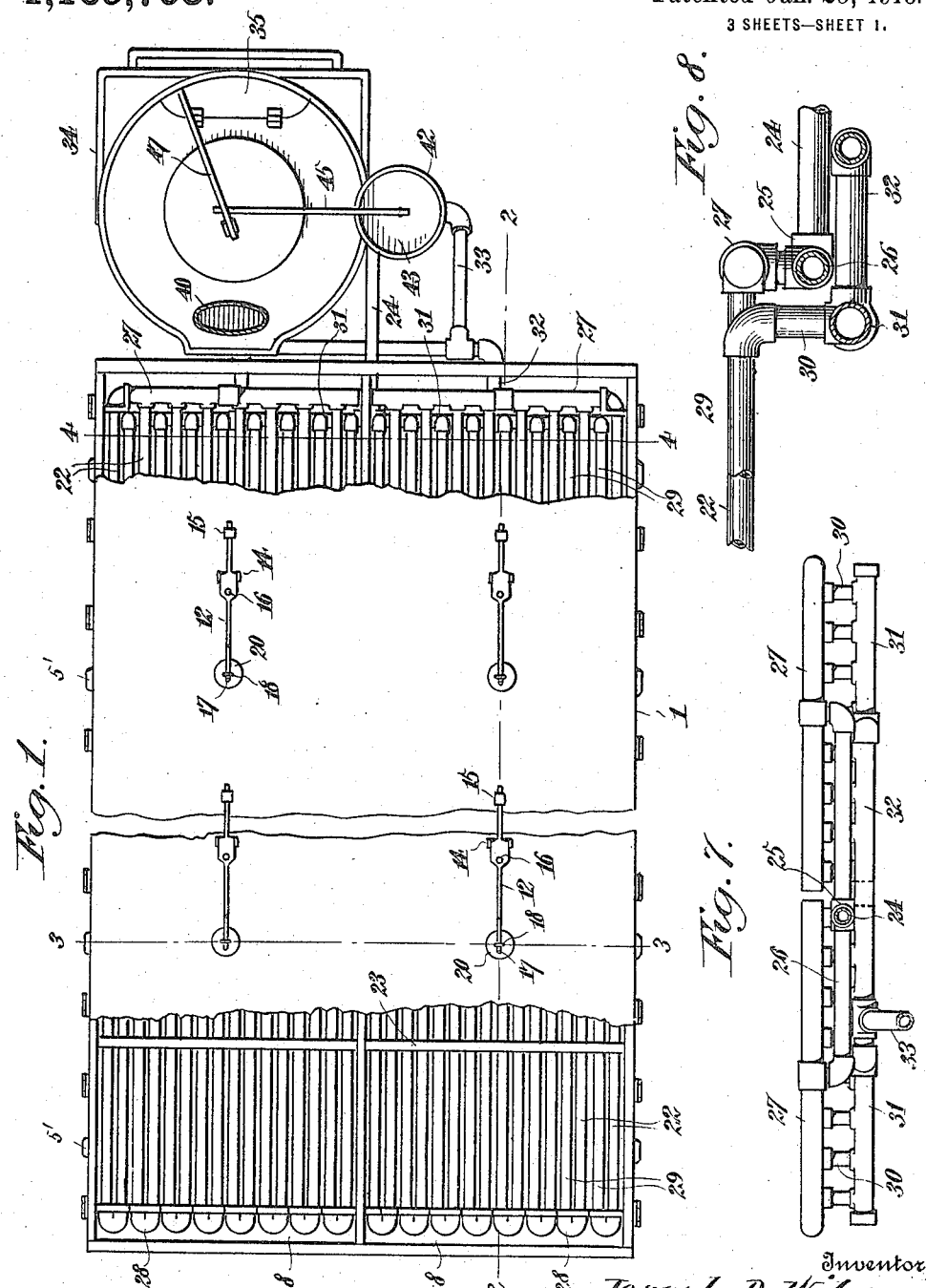

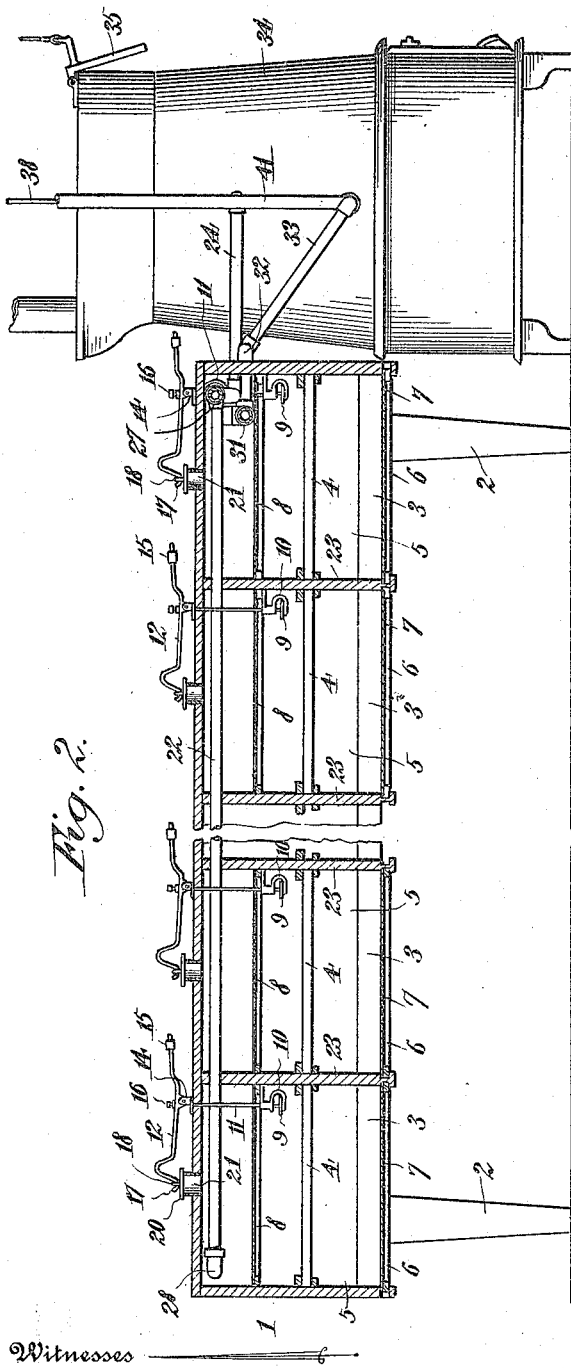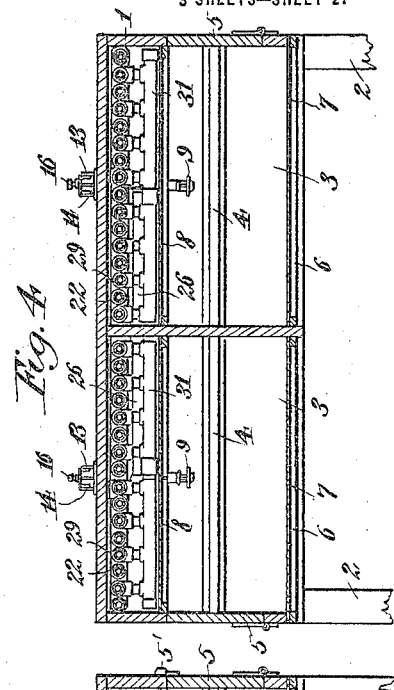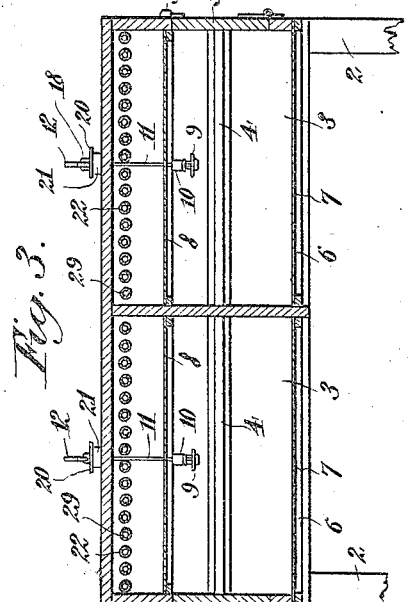

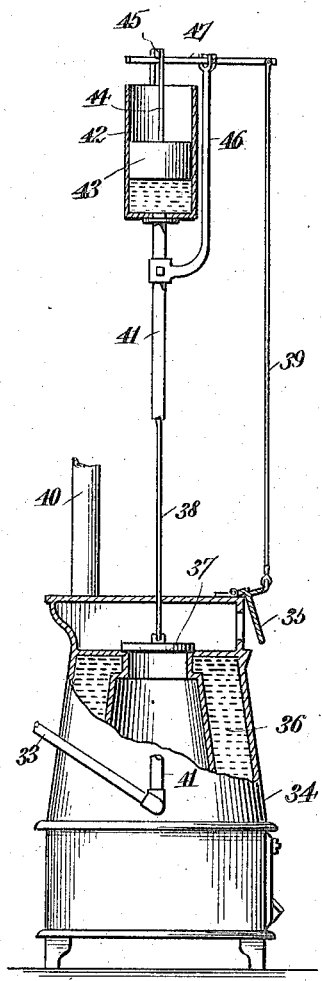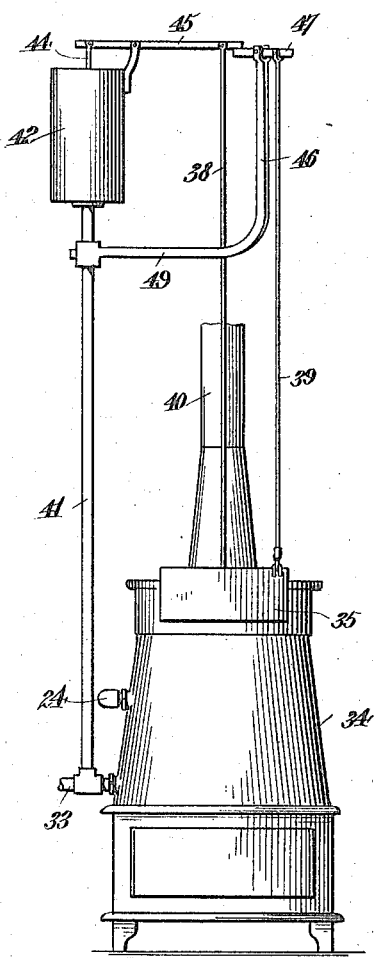

JOSEPH D. WILSON, OF STOCKTON, NEW JERSEY.

INCUBATOR.

1,169,708.   Specification of Letters Patent.   Patented Jan. 25, 1916.

Application filed June 23, 1915. Serial No. 35,891.

*To all whom it may concern:*

Be it known that I, JOSEPH D. WILSON, a citizen of the United States, residing at Stockton, in the county of Hunterdon and State of New Jersey, have invented new and useful Improvements in Incubators, of which the following is a specification.

This invention relates to certain new and useful improvements in incubators.

The object of the invention is to provide an incubator with a hatching compartment having a heating means at the top thereof, a fabric bottom below the egg tray and a sheet of loosely woven material above the egg tray, and to provide a valve for the top above the heating means which is operated by a diaphragm arranged in the compartment above the egg tray, and whereby a uniform amount of heat may be at all times directed to the hatching compartment.

With the above and other objects in view, the improvement resides in the construction, combination and arrangement of parts set forth in the following specification and falling within the scope of the appended claim.

In the drawings: Figure 1 is a top plan view of my improved incubator, parts being broken away, Fig. 2 is a longitudinal sectional view approximately on the line 2—2 of Fig. 1, Fig. 3 is a transverse sectional view approximately on the line 3—3 of Fig. 1, Fig. 4 is a similar sectional view approximately on the line 4—4 of Fig. 1, Fig. 5 is an enlarged sectional view through the heater and the control therefor, Fig. 6 is a view taken at right angles to that shown in Fig. 5, Figs. 7 and 8 are details.

In the accompanying drawings, the body of the incubator is indicated by the numeral 1, the same being supported upon the usual legs 2. The body is divided into any number of egg chambers 3 within which is disposed upon suitable guide cleats the movable egg frames 4. Each of the chambers 3 is provided with a hinged door 5, which is normally retained in a closed position through a latch or lock 5'. Arranged upon the bottom of each of the chambers 3 and forming a closure for the same is a frame 6, the said frame supporting a body of thick fabric, preferably in the nature of felt, and which is indicated by the numeral 7. The felt is of course porous and permits of a certain inflow of cool air, but when the chamber is heated, in a manner which will presently be described, the entrance of cool air through the felt 7 will mix the heated air in the said chamber. Disposed a suitable distance below the top of the incubator and forming what may be termed the top of each of the chambers 3 is a strip of cloth 8, the same being preferably in the nature of burlap or other loosely woven material so as to provide a screen for permitting the free entrance of currents of heated air therethrough.

Arranged within each of the chambers 3 is a metallic diaphragm 9 for which is provided a suitable support 10, and the diaphragm is provided with a rod 11 which passes through the top of the incubator and which is connected with a rod or lever 12. This lever is provided with depending arms or flanges 13 which are pivotally secured to a stud 14 provided upon the top of the incubator and one end of said rod 12 has arranged thereon an adjustable weight 15. The rod 11 passes through a suitable opening in the lever and preferably has its end threaded and engaged by an interiorly threaded member 16, so that the position of the diaphragm 9 upon its support 10 may be regulated. The rod 12 has its end opposite that provided with the adjustable weight 15 hooked, as at 17, to engage with the bail or handle 18 of a valve 20, the said valve being normally rested upon a seat 21, the said seat being preferably in the nature of a tubular member which communicates with the interior of the incubator in the top thereof and above the screen or top 8 of each of the chambers 3. It will be apparent that when the diaphragm is properly adjusted and a sufficient heat passes through the porous top 8 of any of the chambers, the said heat will expand the diaphragm, causing the same to swing the rod 12 and to open the valve 21, thus allowing a quantity of heated air to pass through the top 8 of the chamber.

As stated, the bottom member 7 of each of the chambers is supported upon a frame 6, and this frame is slidable longitudinally of the incubator, so should occasion arise wherein it is found desirable that a greater quantity of cold air than that normally admitted through the bottom 7 is required, any of the frames may be spread outwardly of the chamber, and this may prove desirable when eggs are arranged upon the frames 4 in certain of the chambers and are not arranged upon the said frame in other of the chambers, so that non-occupied chambers may be thoroughly ventilated. Again, it is to be understood that the partitions dividing the chambers extend above the members 8, which have been termed the top walls of the chambers and are connected directly to the top of the incubator, so it will be noted that there is no air communication between any of the chambers. Furthermore, these division members, which for distinction are indicated by the numerals 23, are so disposed that the edges of the adjacent doors 5 contact centrally therewith.

Positioned within one of the ends of the incubator are the heads of water circulating and heating pipes. The numeral 24 designates the lead pipe for the hot water, the same projecting through the end of the incubator and having its inner end provided with a T 25 from which extends branch pipes 26—26, the said branch pipes being each connected with a longitudinally disposed water head 27—27, and extending longitudinally from each of the said heads are the hot water conducting pipes 22. These pipes, as previously stated, are disposed within the incubator between the top of the said incubator and the top 8 of the chambers 3 and pass through suitable openings in the partitions 23. The opposite end of each of the pipes 22 is provided with a U-bend 28 so that the return or cold water pipes 29 are arranged each intermediate of two of the hot water pipes 22. The inner ends of the return pipes 28 are each provided with a vertical pipe extension 30, said pipes being connected with transverse head pipes 31, one of which being arranged below one of the head pipes or manifolds 27, and the manifolds 31 are provided with outlet pipes 32 which extend through the end of the casing, and said pipes may be connected and provided with an outlet pipe 33.

The pipes 24 and 33 communicate with a suitable furnace 34 which may be of any desired or preferred construction, such for instance, as is illustrated in the drawings. The furnace 34 is provided with a top or chamber controlled by a damper 35 and its water jacket 36 is connected with the pipes 24 and 33 as above described. The damper 35 controls the admission of cold air to the top of the furnace, while the heating chamber of the furnace has its top provided with an opening which is normally closed by a damper or throttle 37, the said throttle being provided with a rod 38 which projects through the top of the stove. The damper 16 is hingedly connected with the top of the stove and is provided with a vertically extending rod 39. Said damper is preferably arranged opposite the stove pipe 40.

The numeral 41 designates a vertically disposed pipe connected with the pipe 33, the said pipe communicating with a water receptacle 42 within which is arranged a float 43 having a vertically extending rod 44 which projects through the receptacle 42, said rod or stem 44 being connected with a lever 45 that is supported upon a suitable bracket 46 connected with the receptacle 42. The free end of the lever 45 has connected thereto the end of the rod 38. The rod 39 is also connected with the lever 47 and is supported upon the vertical arm of a substantially L-shaped bracket 49, the said bracket being adjustably secured upon the pipe 41, and the lever 47 is arranged at an angle to the lever 45 but underlies the outer end of the said lever 45. By an arrangement as above the compartments are heated to the required temperature and this temperature will be automatically maintained. The expansion of the liquid in the receptacle 42 will cause the float 43 to rise, and this, by reason of the connections described, will close the throttle 37 and open the damper 35 so that draft at the top of the furnace will be shut off, and at the same time the cold air draft is opened and cold air is admitted over the top of the fire pot and the liquid in the tank being cooled the float will fall and the throttle will open and the draft damper will be closed. The construction just described does not, however, form a part of this invention, but has been set forth at length in order to illustrate a satisfactory and practical means for regulating the temperature of the water passing through the heating pipes for the several chambers of my incubator.

Having thus described the invention, what I claim is:

In an incubator, a hatching compartment having heating means at the top thereof, a frame at the bottom of the compartment having a face of felt, an egg tray mounted on slides in the center of the compartment, a sheet of loosely woven material arranged horizontally in the compartment above the egg tray and below the heating means, a valved opening in the top of the compartment, and a diaphragm arranged in the compartment below the loosely woven sheet and above the egg tray having a member connected therewith and with the valve.

In testimony whereof I affix my signature in presence of two witnesses.

JOSEPH D. WILSON.

Witnesses:
 RUTH SIMON,
 EDGAR W. HUNT.

Copies of this patent may be obtained for five cents each, by addressing the "Commissioner of Patents, Washington, D. C."